(12) United States Patent
Bareiss et al.

(10) Patent No.: US 10,584,602 B2
(45) Date of Patent: Mar. 10, 2020

(54) MULTI-AIRFOIL SPLIT AND REJOIN METHOD

(71) Applicant: UNITED TECHNOLOGIES CORPORATION, Farmington, CT (US)

(72) Inventors: Edward R. Bareiss, Stafford Springs, CT (US); Russell J. Bergman, Windsor, CT (US); Bradley T. Duelm, Wethersfield, CT (US); Michael L. Miller, Euless, TX (US); Paul M. Pellet, Arlington, TX (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 340 days.

(21) Appl. No.: 14/762,630

(22) PCT Filed: Dec. 16, 2013

(86) PCT No.: PCT/US2013/075347
§ 371 (c)(1),
(2) Date: Jul. 22, 2015

(87) PCT Pub. No.: WO2014/143263
PCT Pub. Date: Sep. 18, 2014

(65) Prior Publication Data
US 2015/0369070 A1    Dec. 24, 2015

Related U.S. Application Data

(60) Provisional application No. 61/790,832, filed on Mar. 15, 2013.

(51) Int. Cl.
*B23P 6/00* (2006.01)
*F01D 9/04* (2006.01)
(Continued)

(52) U.S. Cl.
CPC ............ *F01D 9/041* (2013.01); *B23K 1/0018* (2013.01); *B23P 6/00* (2013.01); *B23P 6/005* (2013.01);
(Continued)

(58) Field of Classification Search
CPC .......... F01D 9/041; F01D 9/044; F01D 9/065; F01D 25/12; F01D 9/04; F01D 5/005;
(Continued)

(56) References Cited

U.S. PATENT DOCUMENTS 5,174,715 A    12/1992   Martin
5,248,240 A     9/1993   Correia
(Continued)

FOREIGN PATENT DOCUMENTS

EP          1207270 A1    5/2002
WO     20140133804 A1    9/2014

OTHER PUBLICATIONS

International Search Report for related PCT Application No. PCT/US2013/075347; dated Apr. 23, 2014.
(Continued)

*Primary Examiner* — Rick K Chang
(74) *Attorney, Agent, or Firm* — Cantor Colburn LLP

(57) ABSTRACT

A method for working an airfoil cluster is disclosed. The method may include attaching a first datum to a first portion of the airfoil cluster, and joining a second portion of the airfoil cluster to the first portion, the second portion having a second datum substantially aligned with the first datum in a common plane spaced away from the first and second portions.

14 Claims, 16 Drawing Sheets

(51) Int. Cl.
| | |
|---|---|
| *F01D 5/00* | (2006.01) |
| *B23K 1/00* | (2006.01) |
| *F01D 9/06* | (2006.01) |
| *F01D 25/12* | (2006.01) |
| *F01D 5/18* | (2006.01) |
| *B23H 7/02* | (2006.01) |
| *B23H 9/10* | (2006.01) |
| *B23K 101/00* | (2006.01) |

(52) U.S. Cl.
CPC .............. *F01D 5/005* (2013.01); *F01D 9/04* (2013.01); *F01D 9/044* (2013.01); *F01D 9/065* (2013.01); *F01D 25/12* (2013.01); *B23H 7/02* (2013.01); *B23H 9/10* (2013.01); *B23K 2101/001* (2018.08); *F01D 5/187* (2013.01); *F05D 2220/32* (2013.01); *F05D 2230/14* (2013.01); *F05D 2230/236* (2013.01); *F05D 2230/60* (2013.01); *F05D 2230/64* (2013.01); *F05D 2230/80* (2013.01); *F05D 2240/81* (2013.01); *F05D 2260/202* (2013.01); *F05D 2260/204* (2013.01); *F05D 2300/607* (2013.01); *Y02T 50/676* (2013.01); *Y10T 29/49323* (2015.01)

(58) Field of Classification Search
CPC ....... F01D 5/187; B23P 6/005; B23K 1/0018; B23K 2201/001; F05D 2230/236; F05D 2230/64; F05D 2300/607; B23H 9/10; B23H 7/02; Y10T 29/493
See application file for complete search history.

(56) References Cited

U.S. PATENT DOCUMENTS

| | | | |
|---|---|---|---|
| 5,269,057 A * | 12/1993 | Mendham | B23H 9/10 29/402.08 |
| 6,131,800 A | 10/2000 | Fernihough et al. | |
| 6,254,333 B1 * | 7/2001 | Merry | F01D 5/187 29/889.2 |
| 7,666,618 B2 | 2/2010 | Miasnikov et al. | |
| 2007/0084052 A1 | 4/2007 | Heinrich et al. | |
| 2008/0289179 A1* | 11/2008 | Pellet | B23P 6/002 29/889.1 |
| 2009/0265932 A1 | 10/2009 | Lange | |
| 2009/0274562 A1 | 11/2009 | Minor et al. | |
| 2010/0023943 A1 | 9/2010 | Liang | |
| 2012/0047734 A1 | 3/2012 | Miller et al. | |
| 2015/0352649 A1 | 12/2015 | Bareiss et al. | |
| 2015/0369070 A1 | 12/2015 | Bareiss et al. | |

OTHER PUBLICATIONS

European Search Report Application No. EP 13878289.
International Search Report for Related International Application No. PCT/US13/76453; dated Apr. 11, 2014.
Supplementary European Search Report for EP 13 87 7442.

\* cited by examiner

MULTI-AIRFOIL SPLIT AND REJOIN METHOD

CROSS-REFERENCE TO RELATED APPLICATION

This Application is a US National Stage under 35 USC § 371 of International Patent Application No. PCT/US13/75347 filed on Dec. 16, 2013, and claims priority under 35 USC § 119(e) to U.S. Provisional Patent Application Ser. No. 61/790,832 filed on Mar. 15, 2013.

FIELD OF THE DISCLOSURE

The present disclosure relates generally to gas turbine engines and, more particularly, to a method for working airfoil clusters of a gas turbine engine.

BACKGROUND OF THE DISCLOSURE

Gas turbine engines may typically include a compressor, a combustor, and a turbine, with an annular flow path extending axially through each. Air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate.

The compressor and turbine sections of the engine include airfoil arrays, such as multiple alternating stages of rotor blades and stator vanes. These airfoil arrays may include features, such as endwall contouring, cored serpentine passages, cross-platform serpentine passages, and the like, to mitigate endwall losses, cool the platforms from which the airfoils extend, and better enhance the overall performance of the engine. For various reasons, airfoil arrays may need to be worked or repaired. For example, new airfoil cluster castings may need to be improved upon or employed airfoil arrays may need to be repaired due to damage from extremely high temperatures.

Currently, repair methods have involved cutting apart airfoil clusters and joining a salvaged part with another salvaged part or a new part. However, these current repair methods have not accounted for features, such as end wall contouring, cored serpentine passages, or cross-platform serpentine passages, in the airfoil arrays, which require precise alignment of the joined parts. Accordingly, there exists a need for a reliable method to repair, or otherwise work, airfoil arrays. This invention is directed to solving this need and others.

SUMMARY OF THE DISCLOSURE

According to one exemplary embodiment of the present disclosure, a method for working an airfoil cluster is disclosed. The method may comprise attaching a first datum to a first portion of the airfoil cluster, and joining a second portion of the airfoil cluster to the first portion, the second portion having a second datum substantially aligned with the first datum in a common plane spaced away from the first and second portions.

In a refinement, the method may further comprise attaching more than one datum to the first and second portions of the airfoil cluster.

In another refinement, the method may further comprise machining the first and second register datums relative to predetermined datum of the airfoil cluster.

In another refinement, the method may further comprise aligning the first and second portions using surfaces of the first and second datums substantially aligned in the common plane, an endwall contouring and cross-platform cooling passages of the first and second portions being aligned through the use of the first and second datums.

In another refinement, the method may further comprise providing the airfoil cluster as a stator vane cluster composed of a single-crystal material and positioned in a turbine section of a gas turbine engine.

In another refinement, the method may further comprise attaching the first datum to an outer surface of the first portion and the second datum to an outer surface of the second portion.

According to another exemplary embodiment of the present disclosure, a method for working an airfoil cluster is disclosed. The method may comprise attaching a first register block to the airfoil cluster, attaching a second register block to a supplemental portion, and joining the supplemental portion to the airfoil cluster, the first and second register blocks having a predefined arrangement with respect to one another which aligns the supplemental portion with the airfoil cluster.

In a refinement, the method may further comprise providing each of the first and register blocks with an outer surface, the outer surface of the first register block and the outer surface of the second register block having a predefined contour arrangement with respect to one another.

In another refinement, the method may further comprise aligning the supplemental portion with the airfoil cluster by setting the outer surfaces of the first and second register blocks on a surface that matches the predefined contour arrangement.

In another refinement, the method may further comprise aligning an endwall contouring and cross-platform cooling passages of the airfoil cluster and the supplemental portion through the use of the first and second register blocks.

In another refinement, the method may further comprise removing a portion of the airfoil cluster such that a multi-directional passage of the airfoil cluster is preserved.

In another refinement, the method may further comprise removing the portion of the airfoil cluster by cutting off the portion around the multi-directional passage.

In yet another refinement, the method may further comprise removing the at least one first register block and the at least one second register block, blending away excess material from the airfoil cluster and performing additional manufacturing operations on the airfoil cluster.

According to yet another exemplary embodiment of the present disclosure, a method for working airfoil clusters of a gas turbine engine is disclosed. The method may comprise providing a first airfoil cluster having a first portion and a second portion, the first portion including a multi-directional passage; providing a second airfoil cluster having a fourth portion, the fourth portion including a multi-directional passage; attaching a first register block to the first portion of the first airfoil cluster; attaching a second register block to the fourth portion of the second airfoil cluster; cutting off the second portion of the first airfoil cluster such that the multi-directional passage of the first portion is preserved; aligning the first portion with the fourth portion through surfaces of the first and second register blocks; joining the first and fourth portions together; and removing the first and second register blocks.

In a refinement, the method may further comprise providing the second airfoil cluster with a third portion, and cutting off the third portion of the second airfoil cluster such that the passage of the fourth portion is preserved.

In another refinement, the method may further comprise determining a location of a cut on the second airfoil cluster based on a location of a cut on the first airfoil cluster, and offsetting the locations of the cuts on the first and second airfoil clusters based on an amount of kerf.

In another refinement, the method may further comprise providing an attachment hole and a separate locating hole in each of the first and second register blocks for attaching and locating the first and second airfoil clusters to a fixture during a cutting process, and using the attachment hole in the first register block for attachment of the first airfoil cluster to a fixture during a joining process.

In another refinement, the method may further comprise machining the surfaces of the first and second register blocks in order to align the first and second airfoil clusters during the cutting process and the joining process.

In another refinement, the method may further comprise aligning the surfaces of the first and second register blocks in a plane not within a space of the first and second airfoil clusters, and aligning an endwall contouring and cross-platform cooling passages of the first and second airfoil clusters through the use of the aligned surfaces of the first and second register blocks.

In yet another refinement, the method may further comprise attaching two first register blocks to the first portion of the first airfoil cluster and two second register blocks to the fourth portion of the second airfoil cluster.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

BRIEF DESCRIPTION OF THE DRAWINGS

FIG. 4 is a top view of an outer platform of the airfoil cluster of FIG. 3 with;

FIG. 7 is a perspective view of an airfoil cluster with register blocks welded on;

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION

Figure 1:
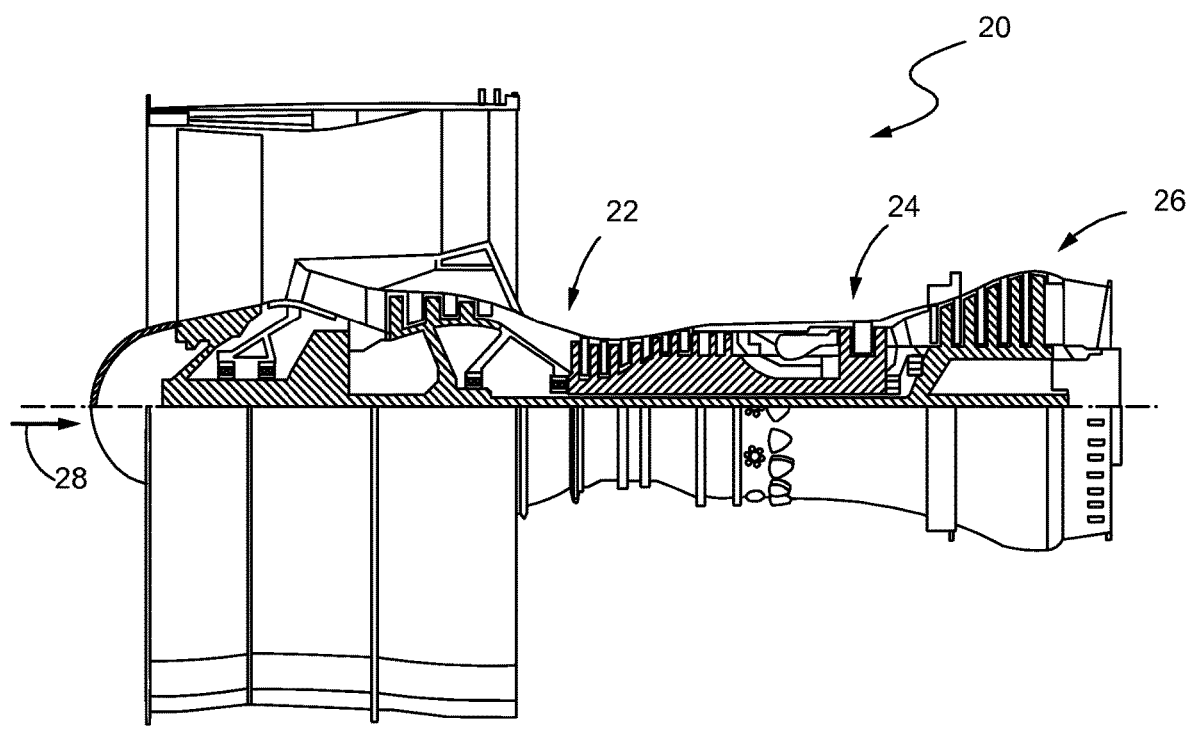
FIG. 1 is a cross-sectional view of a gas turbine engine.

Referring now to the drawings, and with specific reference to FIG. 1, in accordance with the teachings of the disclosure, an exemplary gas turbine engine 20 is shown. The gas turbine engine 20 may generally comprise a compressor section 22 where air is pressurized, a combustor 24 downstream of the compressor section which mixes and ignites the compressed air with fuel and thereby generates hot combustion gases, a turbine section 26 downstream of the combustor 24 for extracting power from the hot combustion gases, and an annular flow path 28 extending axially through each. The gas turbine engine 20 may be used on an aircraft for generating thrust or power, or in land-based operations for generating power as well.

Figure 2:
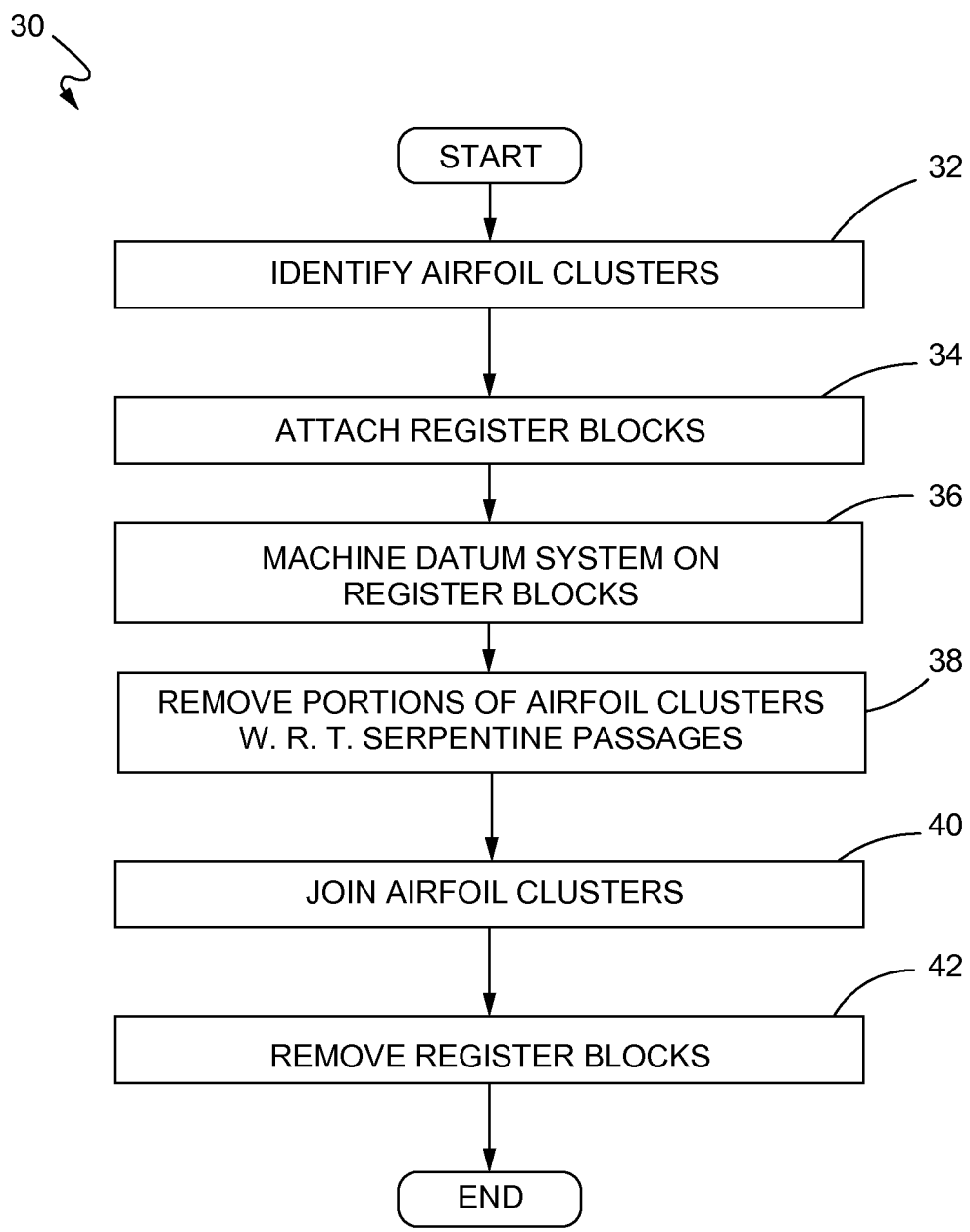
FIG. 2 is an exemplary flowchart outlining a method for working an airfoil cluster of the gas turbine engine of FIG. 1, according to an embodiment of the present disclosure.

Turning now to FIG. 2, an exemplary flowchart outlining a method 30 for working an airfoil cluster of the gas turbine engine 20 is shown. The method 30 may be applied to any airfoil cluster in a stage of rotor blades or stator vanes in the compressor section 22 or the turbine section 26 of the gas turbine engine 20. For example, the method 30 may be applied to an airfoil cluster 50, such as a stator vane cluster, shown in FIG. 3.

Airfoil cluster 50 may be composed of a single-crystal material, such as a single-crystal nickel super alloy, which is a rhenium-free single-crystal. Other suitable materials are certainly possible. The airfoil cluster 50 may include a first airfoil 52 and a second airfoil 54. Although not shown, it is to be understood that the cluster 50 may comprise more than two airfoils. Each of the airfoils 52, 54 extends axially (fore to aft with respect to engine axis X in FIG. 1) from a leading edge 56 to a trailing edge 58 and extends radially from an inner platform 60 to an outer platform 62.

The airfoil cluster 50 may also include various features to enhance engine performance. For example, an endwall 64 of the outer platform 62 and/or inner platform 60 may be contoured in order to mitigate endwall losses. Furthermore, as shown best in FIG. 4, the outer platform 62 (or inner platform 60) may also include various passages, such as passages 66, 68, 70 in order to provide cooling to the platforms 60, 62 and airfoils 52, 54. Passages 66 may be "cross-platform" extending laterally across and generally defined by a surface 65 of the platform 62, and may include trip strips 67 to create turbulence as air flows through the passages 66. In addition, passages 66 may be serpentine or multi-directional, extending in more than one direction across the surface 65 of the platform 62.

Figure 3:
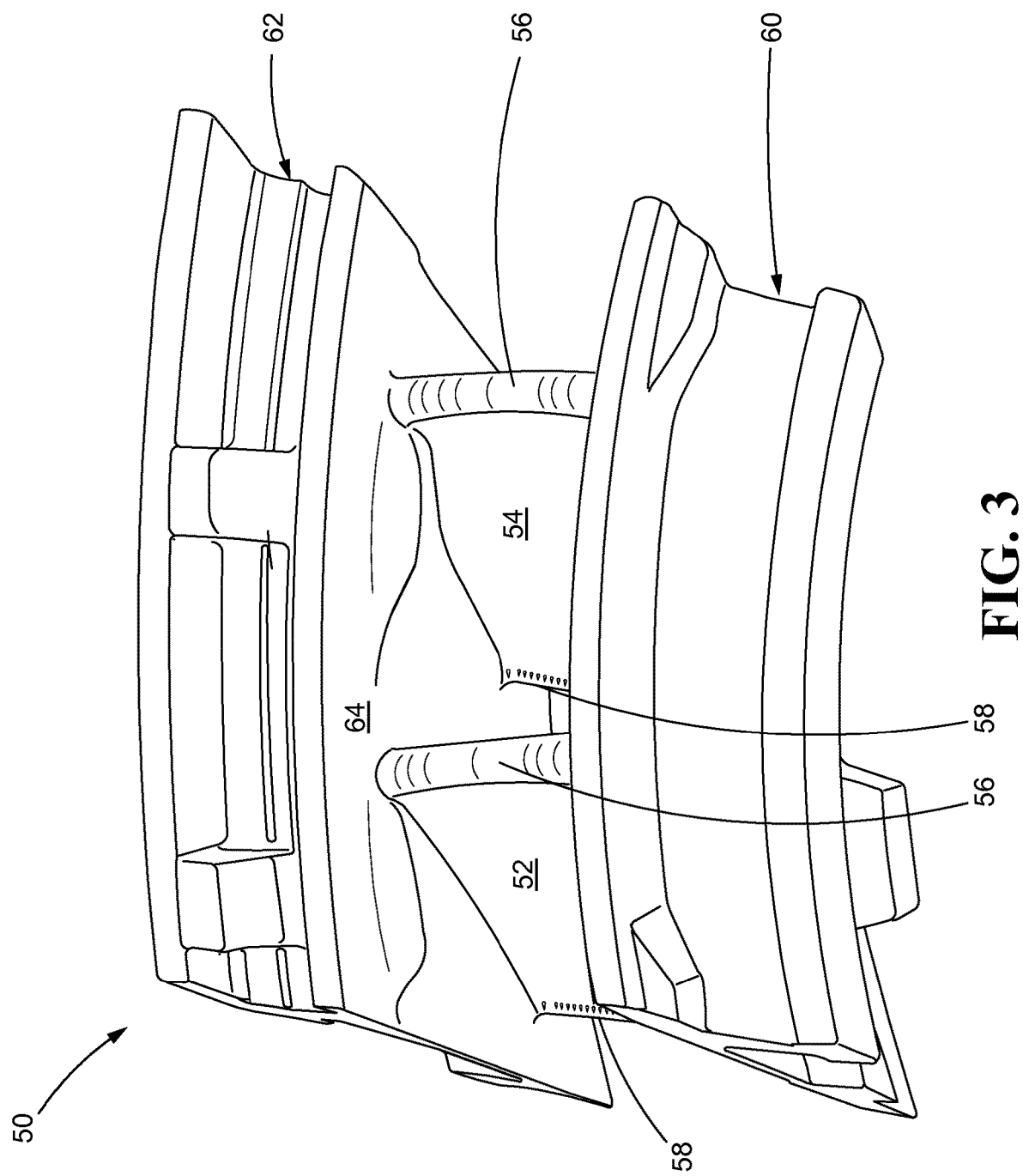
FIG. 3 is a perspective view of an airfoil cluster of the gas turbine engine of FIG. 1.
Figure 4:
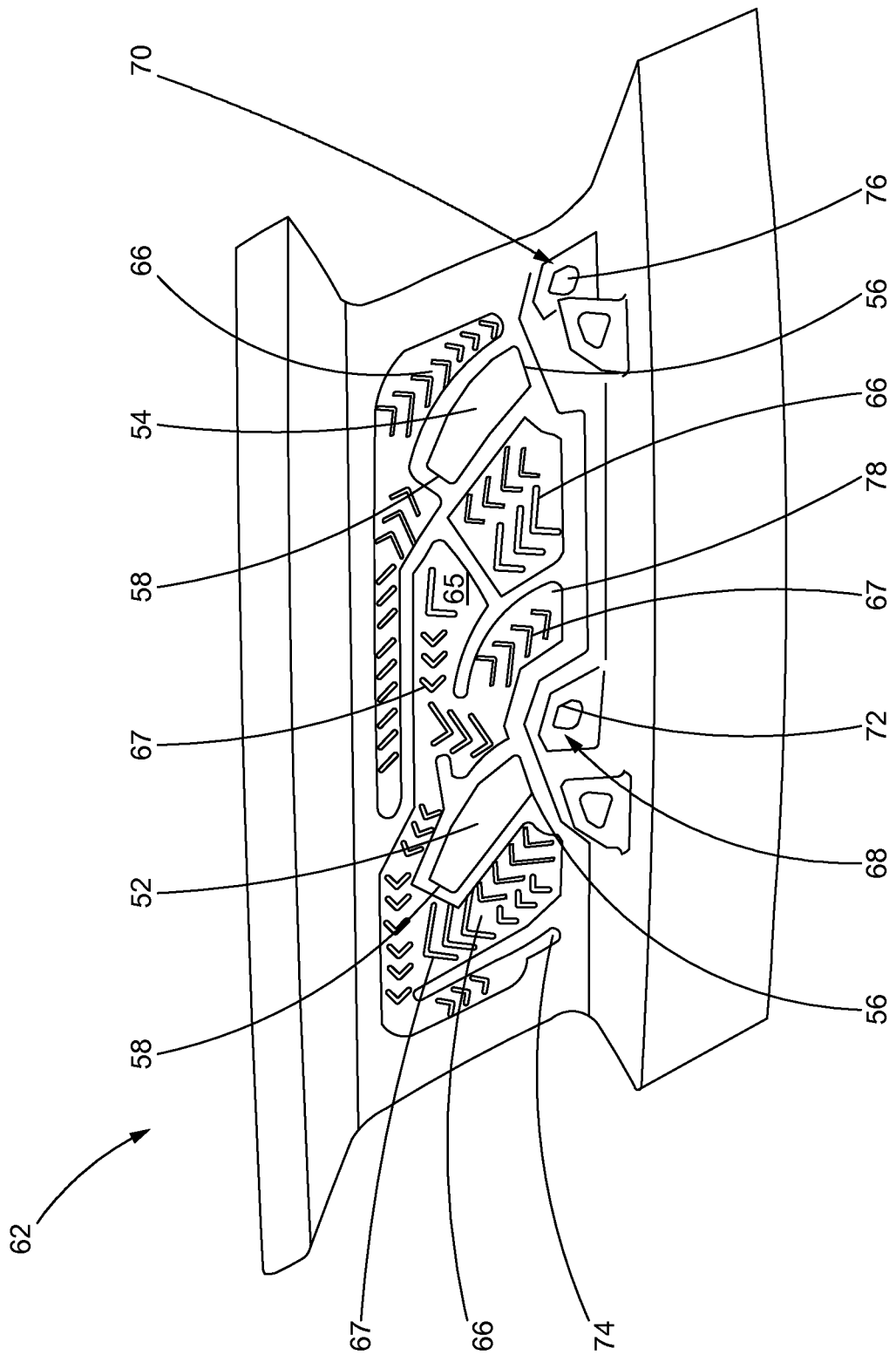

Passages 68, 70 may be "cored" or extend internally within the platform, and may also be serpentine or multi-directional, extending in more than one direction within the platform. For example, a first passage 68 may extend internally within the outer platform 62 from an inlet 72 to an outlet 74. From the inlet 72 to the outlet 74, first passage 68 may traverse in different directions (such as axially, radially, and/or circumferentially with respect to engine axis X in FIG. 1) within the platform 62, at least in part wrapping around the leading edge 56 of the first airfoil 52. Similarly, a second passage 70 may extend internally within the outer platform 62 from an inlet 76 to an outlet 78. From the inlet 76 to the outlet 78, second passage 70 may traverse in different directions (such as axially, radially, and/or circumferentially with respect to engine axis X in FIG. 1) within the platform 62, at least in part wrapping around the leading edge 56 of the first airfoil 54. It is to be understood that the endwall 64 contouring and passages 66, 68, 70 shown in FIGS. 3 and 4 are merely exemplary, and that other various features, arrangements, and configurations of the airfoil cluster 50 may certainly benefit from the method disclosed herein.

Figure 5:
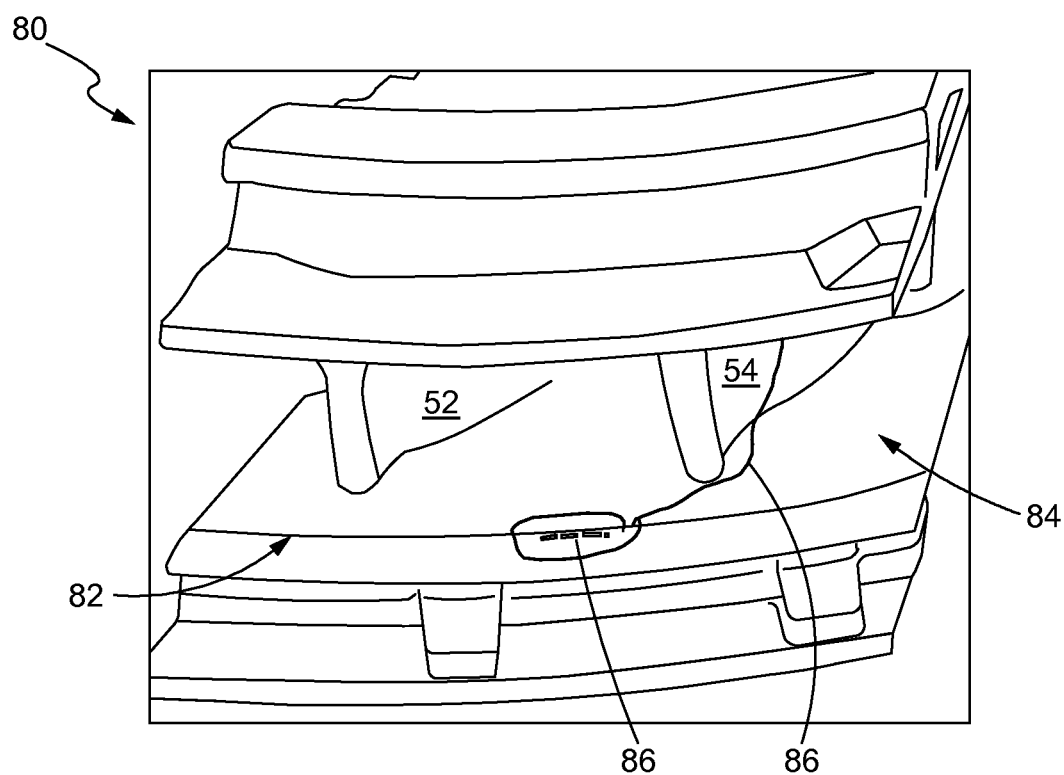
FIG. 5 is a perspective view of an exemplary first airfoil cluster.

At identify airfoil clusters 32 in method 30 in FIG. 2, the airfoil cluster(s) to be worked (or repaired) are identified. For example, a first airfoil cluster 80, shown in FIG. 5, may be identified. The first airfoil cluster 80 may have a first portion 82 including first airfoil 52, and a second portion 84 including second airfoil 54. The second portion 84 may have incurred damage 86 during casting or engine operation, rendering the second portion 84 with second airfoil 54 unusable and the first portion 82 with first airfoil 52 salvageable.

Figure 6:
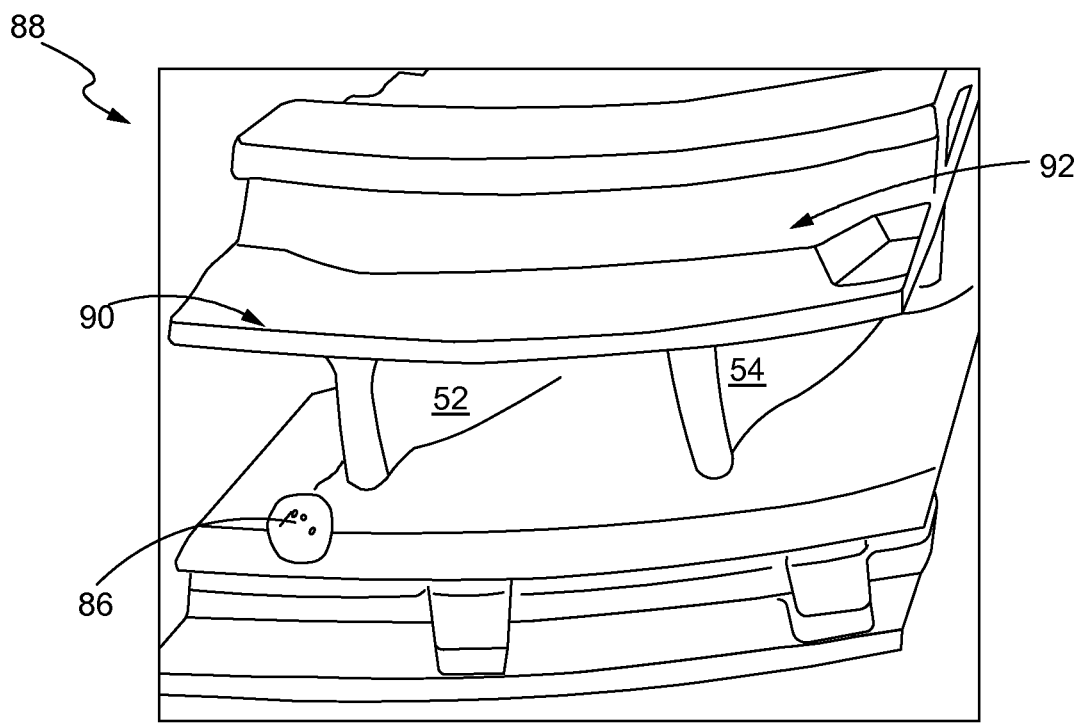
FIG. 6 is a perspective view of an exemplary second airfoil cluster.

A supplemental or second airfoil cluster 88, shown in FIG. 6, may also be identified. The second airfoil cluster 88 may have a third portion 90 including first airfoil 52 and a fourth portion 92 including second airfoil 54. The third portion 90 may have incurred damage 86 during casting or engine operation, rendering the third portion 90 with first airfoil 52 unusable and the fourth portion 92 with second airfoil 54 salvageable. Thus, the first portion 82 of first airfoil cluster 80 may be matched with the fourth portion 92 of the second airfoil cluster 88 to form a whole new cluster having usable first and second airfoils 52, 54. It is to be understood that the method 30 disclosed herein may also be applied to airfoil clusters not having incurred damage.

Figure 7:
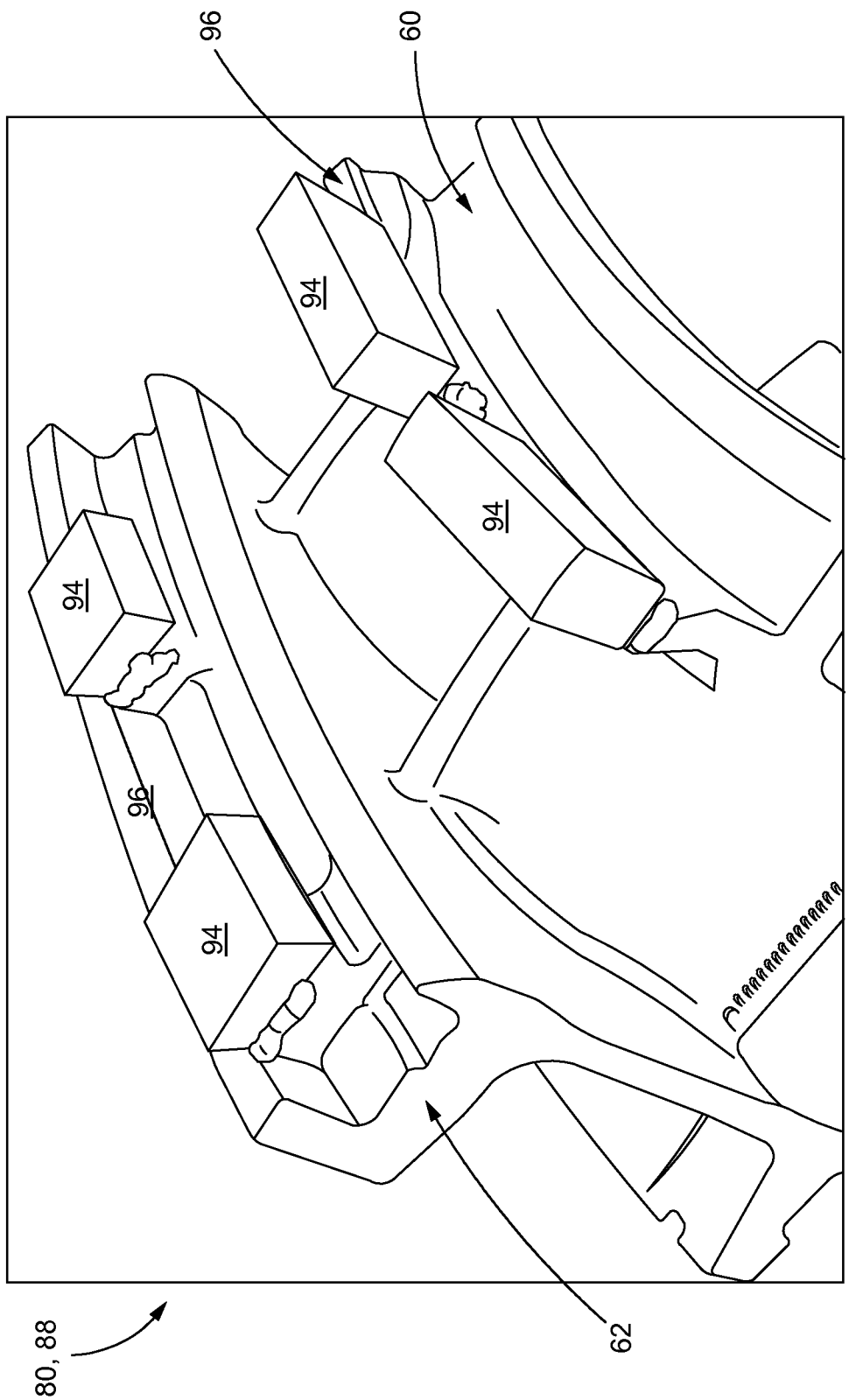

Next, at attach register blocks 34 in method 30 (FIG. 2), datums or register blocks 94 are attached to the airfoil cluster 80, 88, as shown best in FIG. 7. The datums or register blocks 94 may be formed out of a metal, such as steel, in a rectangular shape, although other suitable materials and shapes are possible. Register blocks 94 may be mounted to a forward surface 96 of the inner and outer platforms 60, 62 via welding or other techniques. The forward surface 96 may be taken in reference to an engine axis X (FIG. 1) running fore to aft through the engine 20. For example, forward surface 96, is a foremost surface of the airfoil cluster when positioned within the engine 20. It is certainly possible to mount the register blocks 94 to other surfaces or parts of the airfoil cluster 80, 88 as well. Although four register blocks 94 are shown as being attached to the airfoil cluster 80, 88, specifically two register blocks on each portion 82, 84, 90, 92 in FIG. 7, it is to be understood that any number of register blocks 94 may be used, such as one or more than one, without departing from the spirit of the disclosure.

Figure 8:
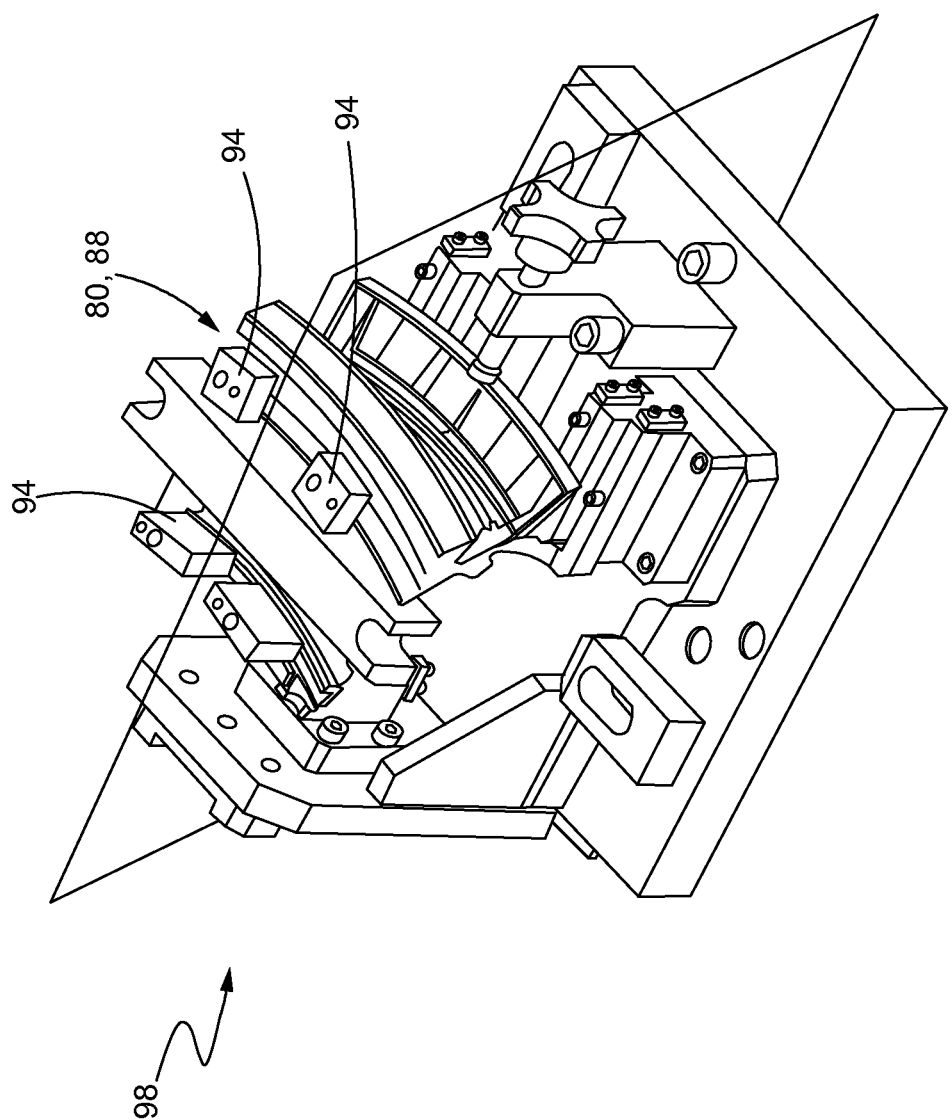
FIG. 8 is a perspective view of the airfoil cluster of FIG. 7 within a milling fixture.

At machine datum system on register blocks 36 in method 30 (FIG. 2), a datum system is machined or registered on the register blocks 94. For example, the airfoil cluster 80, 88 may be placed within a milling fixture 98, as shown best in FIG. 8. The milling fixture 98 may machine the datum system on the register blocks 94 relative to predetermined datum of a design for the airfoil clusters 80, 88. In so doing, the register blocks on any airfoil cluster will be machined consistently from one airfoil cluster to the next, thereby creating the same new datum surfaces on every airfoil cluster.

Figure 9:
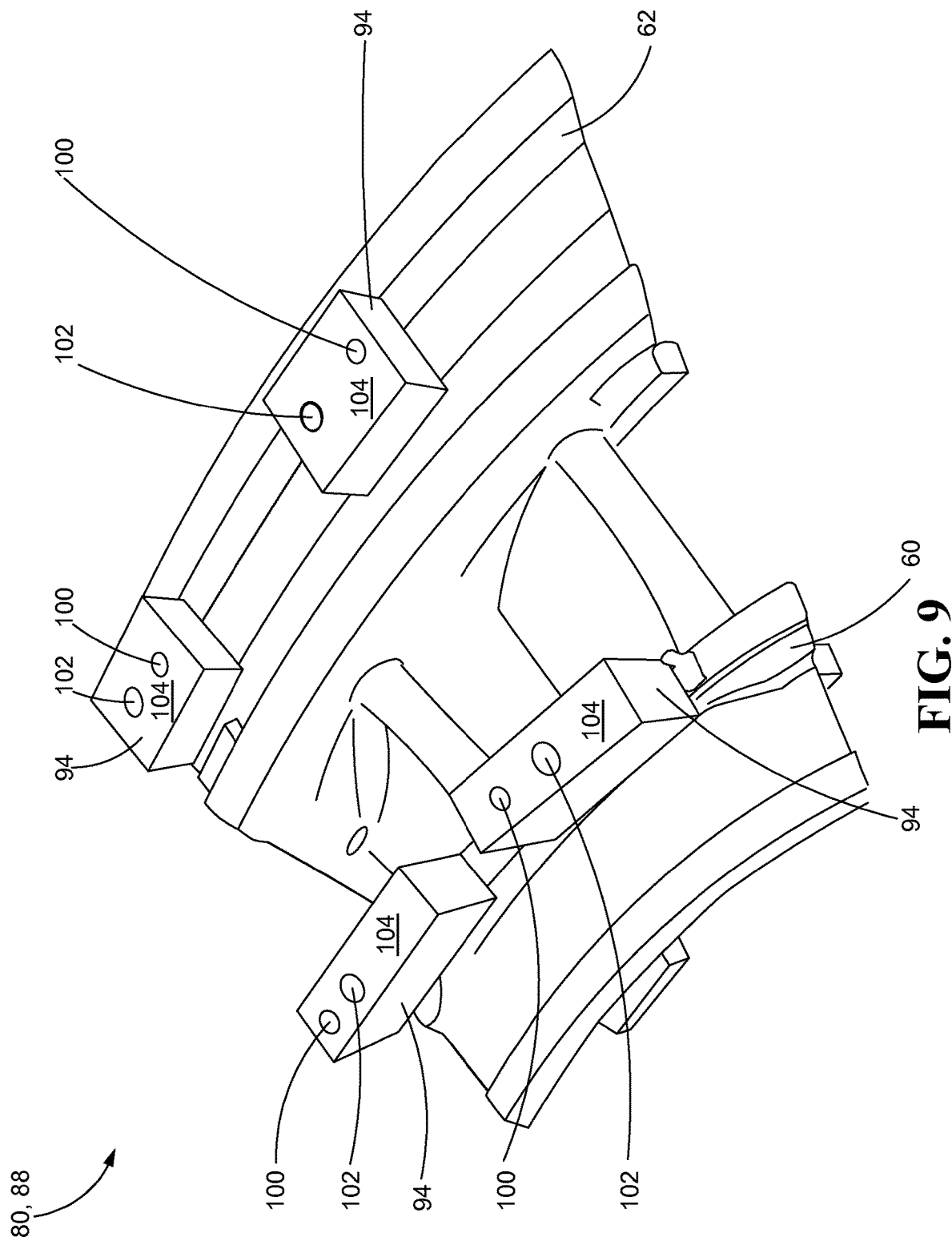
FIG. 9 is a perspective view of the airfoil cluster of FIG. 7 after machining the register blocks using the milling fixture of FIG. 8.
Figure 10:
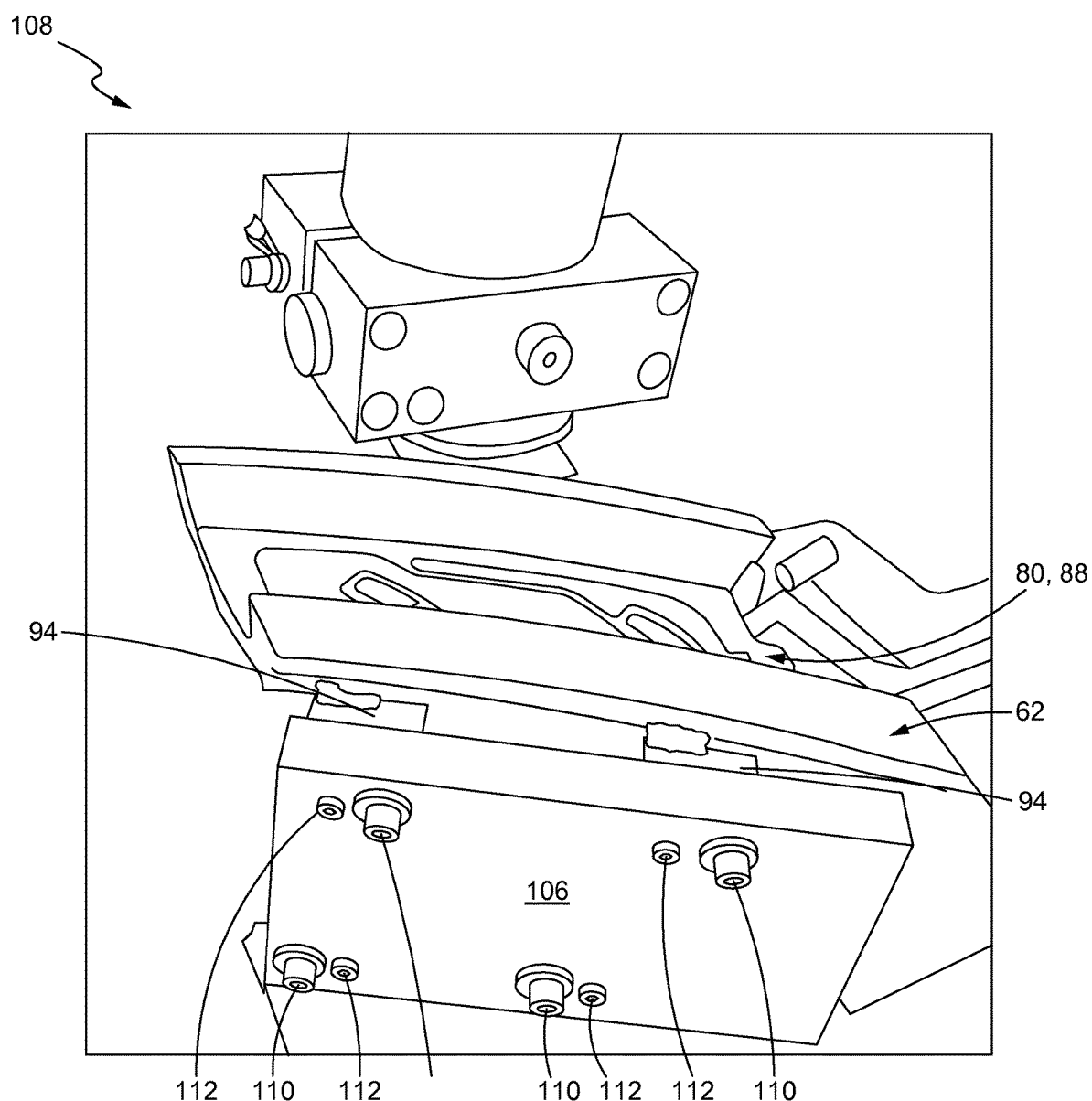
FIG. 10 is a perspective view of the airfoil cluster of FIG. 9 within a wire electrical discharge machining fixture.

For example, as shown best in FIG. 9, the datum system may include an attachment hole 100 and a locating hole 102 provided in each of the register blocks 94 by the milling fixture 98. A configuration and arrangement of the attachment holes 100 and locating holes 102 in each of the register blocks 94 may be machined relative to predetermined datum of the airfoil cluster, as well as fixtures used in latter steps of the method. The attachment hole 100 may be threaded to allow direct attachment of the register block 94 to a fixture via a bolt or other suitable means. The locating hole 102 may facilitate location or positioning of the register block 94 to a fixture via a pin or other suitable means. Machining the holes 100, 102 in the register blocks 94 allows for attachment and location of the airfoil cluster 80, 88 to a fixture without having to drill holes in the airfoil cluster itself, thereby preserving a structure and integrity of the airfoil cluster.

In addition, the datum system may include a face or outer surface 104 of each of the register blocks 94 machined relative to predetermined datum of the airfoil cluster. The outer surfaces 104 of the register blocks 94 may have a predefined contour arrangement with respect to one another. For example, the outer surfaces 104 may be machined such that each outer surface 104 of the register blocks 94 is aligned in a same or common predetermined plane not within a space of the airfoil clusters 80, 88, such as a plane substantially parallel to and away from the forward surface 96 of the airfoil clusters. The register blocks 94 may be machined to a same height. By machining the outer surface 104 of every register block 94 to the same predetermined face or surface such that the outer surface 104 of every register block 94 shares a common plane spaced away from the airfoil clusters 80, 88, a standard of precise alignment for the airfoil clusters may be established in an axial position. It is to be understood that other positions of alignment using the register blocks on the airfoil clusters are certainly possible.

Next, at remove portions of airfoil clusters with respect to serpentine passages 38 in method 30 (FIG. 2), portions of the first and second airfoil clusters 80, 88 are removed with respect to the passages 68, 70. For example, since the first portion 82 of the first airfoil cluster 80 is salvageable and the second portion 84 of the first airfoil cluster 80 is unusable, the second portion 84 may be removed while preserving or keeping the passage 68 intact. The second portion 84 may be removed by cutting the first airfoil cluster 80 via a wire electrical discharge machining (wire EDM) process, as shown in FIGS. 10-13, although other techniques for removal, such as grinding, are certainly possible. The airfoil cluster 80 may be positioned and attached to a plate 106 of a wire EDM fixture 108 using pins 110 and bolts 112 through the attachment and locating holes 100, 102, respectively, of the register blocks 94.

Figure 11:
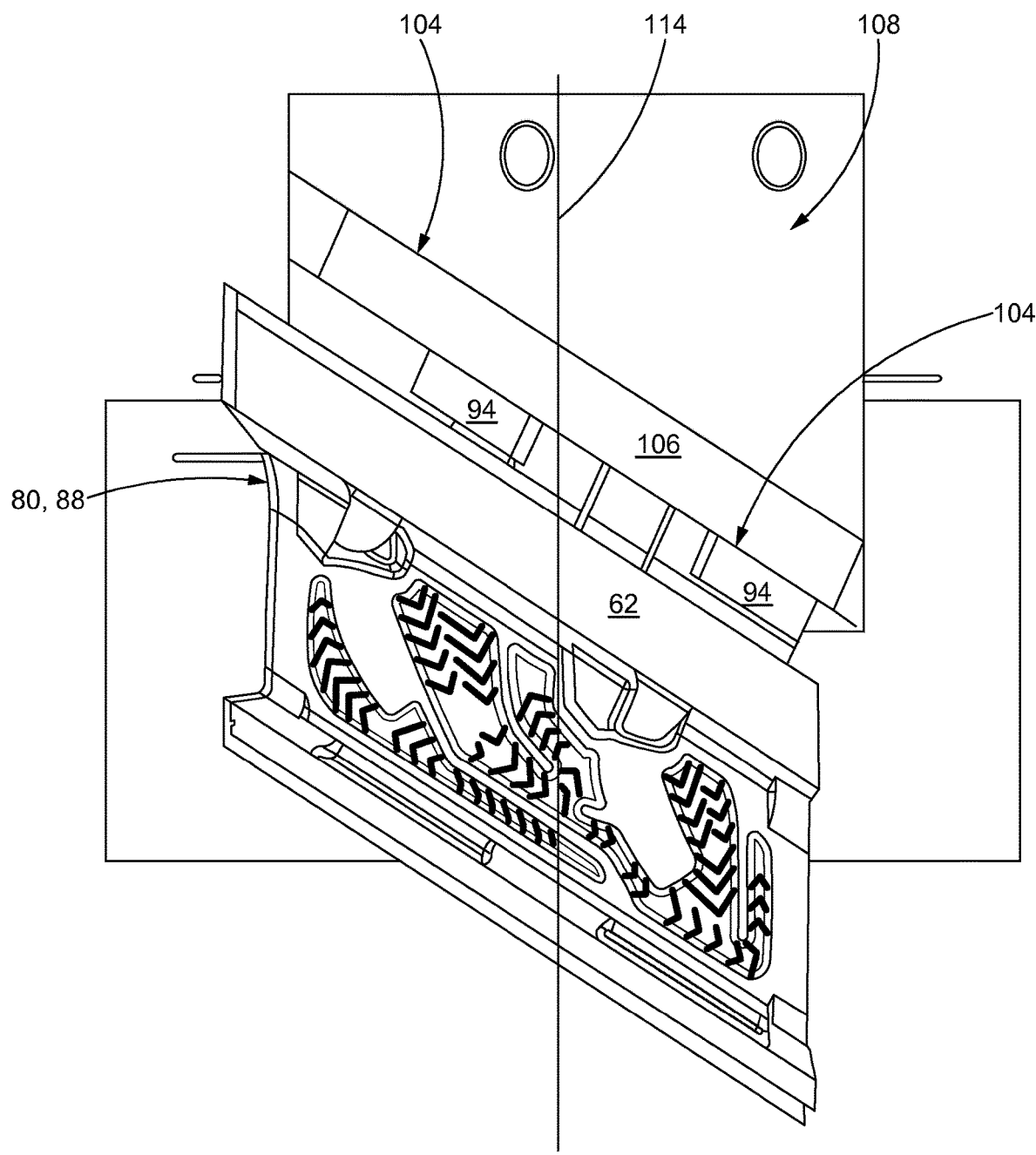
FIG. 11 is a top view of the airfoil cluster within the wire electrical discharge machining fixture of FIG. 10.
Figure 12:
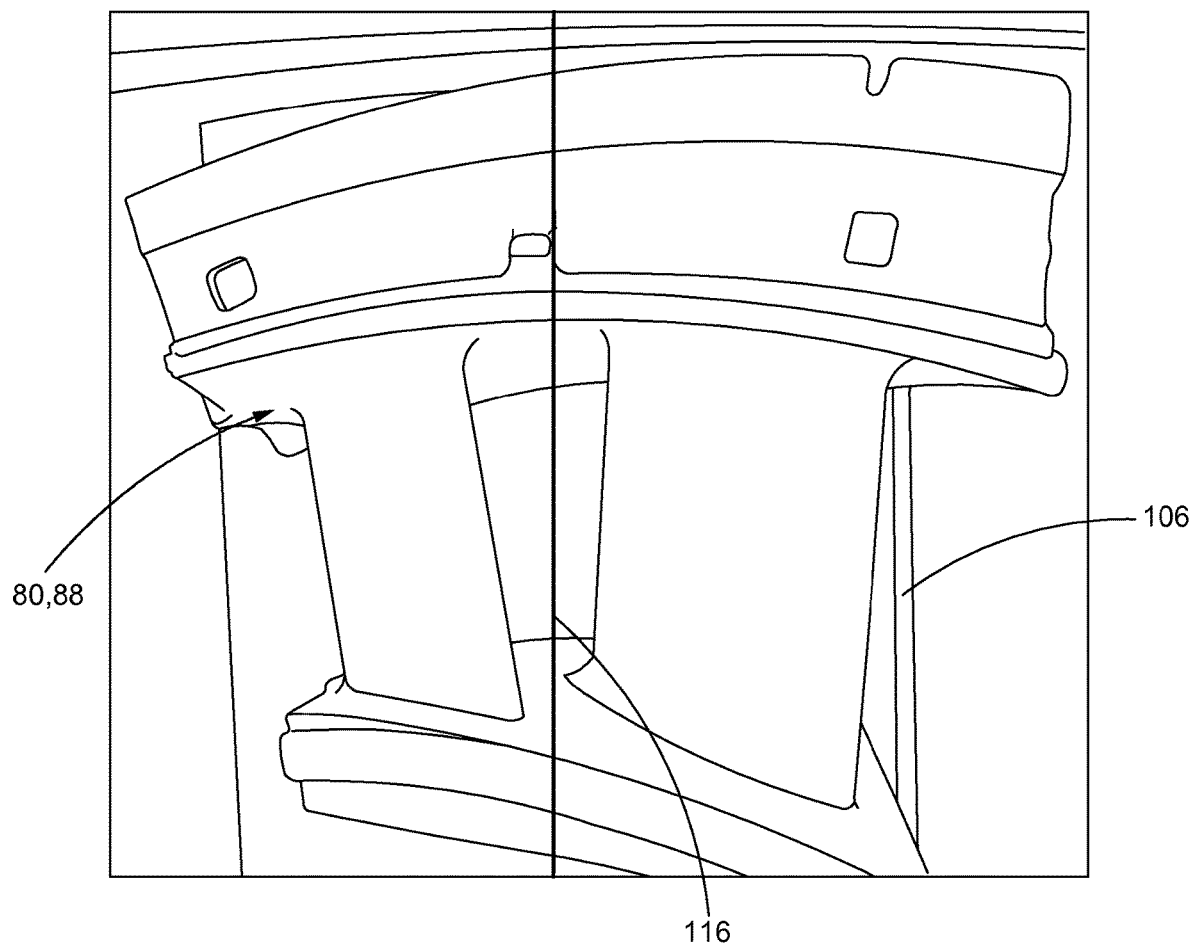
FIG. 12 is an enlarged side view of the airfoil cluster within the wire electrical discharge machining fixture of FIG. 10.
Figure 13:
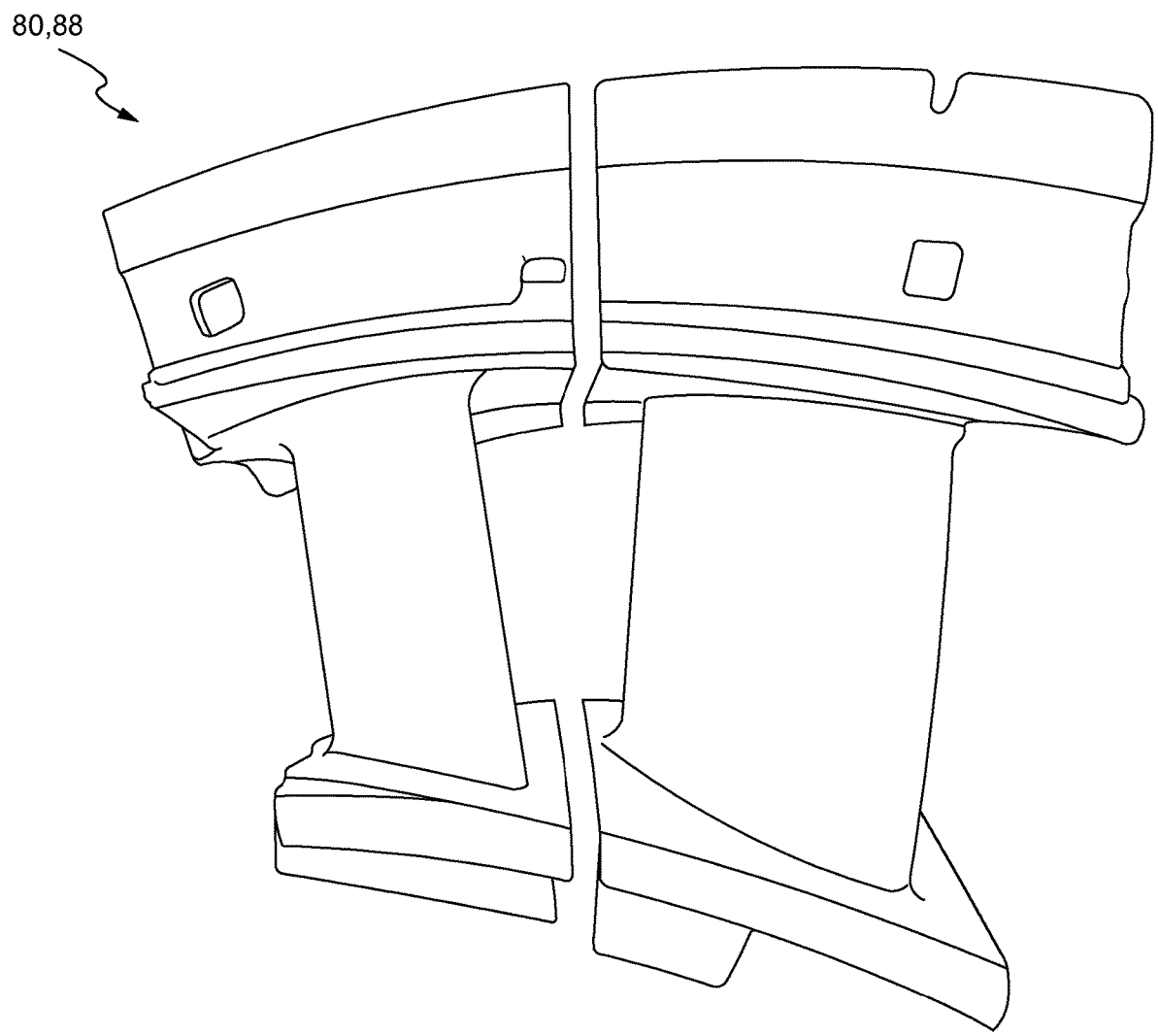
FIG. 13 is a side view of the airfoil cluster of FIG. 10 after being cut by the wire electrical discharge machining fixture.

A location of a cut plane 114 for a wire 116 of the wire EDM fixture 108 to cut through the first airfoil cluster 80 may be determined based on a location of the passage 68 of the first portion 82. For example, the cut plane 114 may be determined such that it does not pass through any part of the passage 68 of the first portion 82 of the first airfoil cluster 80. As shown in FIG. 11, the cut plane 114 may be located around (or to the right) of the inlet 72 of passage 68 of the first portion 82, thereby preserving or keeping the passage 68 intact. Once the second portion 84 of the first airfoil cluster 80 is cut off, it may be discarded.

Similarly, for the second airfoil cluster 88, since the fourth portion 92 is salvageable and the third portion 90 unusable, the third portion 90 may be removed without damaging the passage 70 of the fourth portion 92. For example, the cut plane 114 may be located around (or to the left) of the outlet 78 of the passage 70 of the fourth portion 92. Furthermore, the location of the cut plane on the second airfoil cluster 88 may be determined based on the location of the cut plane on the first airfoil cluster 80 such that when the first portion 82 of the first airfoil cluster 80 is joined with the fourth portion 92 of the second airfoil cluster 88, the portions 82, 92 are precisely aligned and matched to make a whole new airfoil cluster with original predetermined dimensions. In addition, the location of the cut planes 114 on the first and second airfoil clusters 80, 88 may be offset based on an amount of kerf (width of the cut or material cut off on either side of the wire 116 during the wire EDM process).

It is to be understood that step 38 may be an optional step in the method 30, and that the disclosed method 30 may be applied to airfoil clusters or airfoil singlets (structures having a single airfoil) that do not need portions to be removed without departing from the spirit of the disclosure. For example, in an alternative embodiment, the method 30 may be applied to one airfoil cluster that needs a portion removed and a new airfoil cluster or singlet that does not need any portions removed. Alternatively, the method 30 may be applied to two new airfoil clusters or singlets that both do not need portions removed.

At join airfoil clusters 40, the first portion 82 of the first airfoil cluster 80 may be joined with the fourth portion 92 of the second airfoil cluster 88. For example, the first and second airfoil clusters 80, 88 may be joined via diffusion brazing. Other welding, brazing, or joining techniques may be used as well. The portions 82, 92 may be cleaned prior to brazing. In addition, the first portion 82 and fourth portion 92 may be tack welded for a temporary attachment of the two portions before the brazing process.

Figure 14:
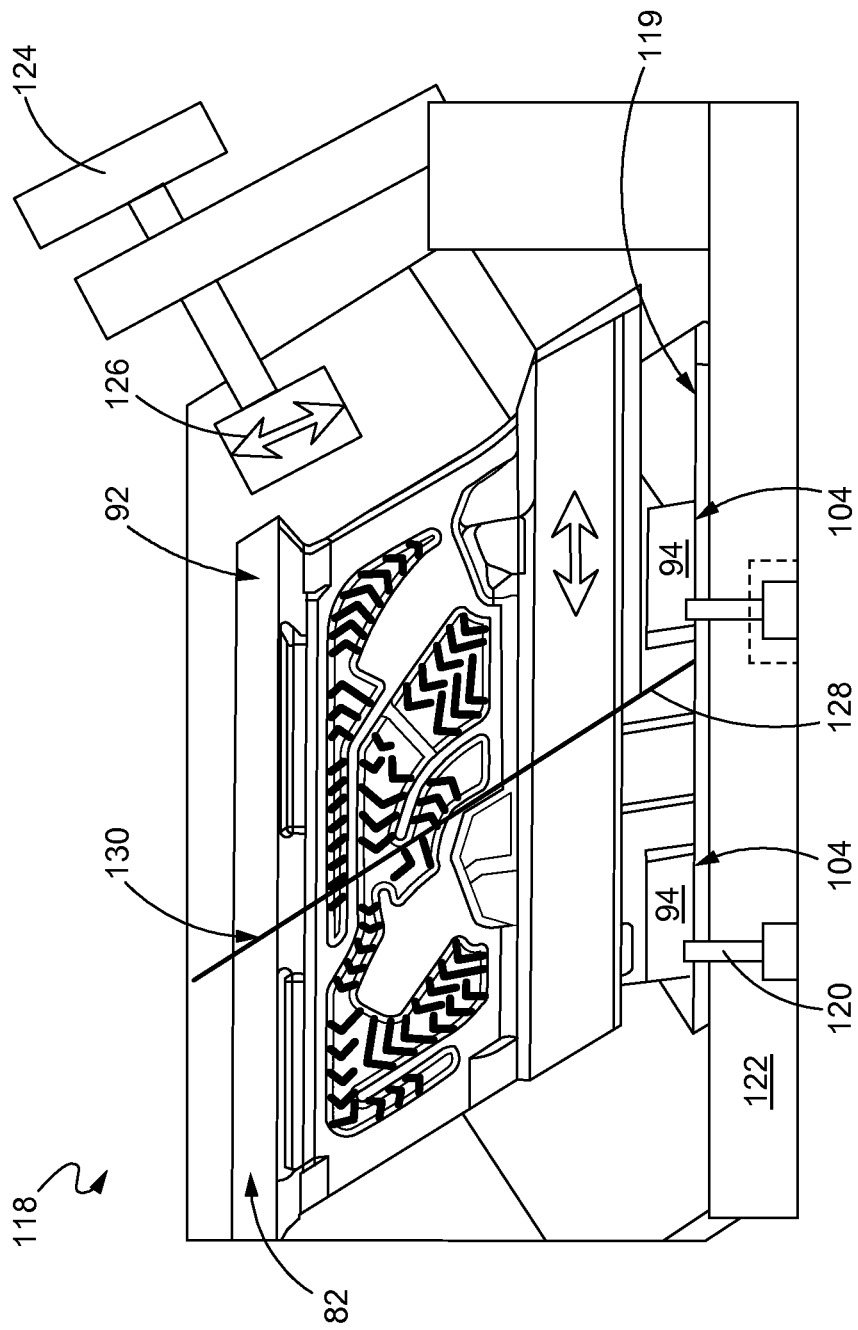
FIG. 14 is a top view of a portion of the airfoil cluster of FIG. 13 aligned with another airfoil cluster portion within a brazing assembly fixture.

As shown best in FIG. 14, the first portion 82 of the first airfoil cluster 80 and the fourth portion 92 of the second airfoil cluster 88 may be aligned on a brazing assembly fixture 118 using the register blocks 94. As described in step 36 above, the outer surfaces 104 of all the register blocks 94 of the first and second airfoil clusters 80, 88 have a predefined contour arrangement such that they are machined to a common plane, relative to predetermined datum of the airfoil cluster. Therefore, when the first and fourth portions 82, 92 are resting on the outer surfaces 104 of register blocks 94, and the outer surfaces 104 are set on a surface 119 that matches the predefined contour arrangement, the two portions 82, 92 are automatically aligned in the axial direction. In so doing, the contouring of the endwall 64 and the passages 66 are precisely aligned between the first and fourth portions 82, 92 of the first and second airfoil clusters 80, 88.

The first portion 82 may be attached to the brazing assembly fixture 118 via bolts 120 threaded through a plate 122 of the brazing assembly fixture 118 to the attachment holes 100 of the register blocks 94. Thus, the register blocks 94 also provide for attachment and alignment of the airfoil clusters to the brazing assembly fixture 118. The fourth portion 92 may be slidably engaged with the plate 122 of the brazing assembly fixture 118 such that a pusher arm 124 of the brazing assembly fixture 118 may push the fourth portion 92 against the first portion 82. Positioned square to the fourth portion 92, a push bar 126 on the pusher arm 124 of the brazing assembly fixture 118 may evenly apply pressure across the inner and outer platforms 60, 62 of the fourth portion 92 to form a small braze gap 128 between a bond joint 130 of the first portion 82 and fourth portion 92.

Figure 15:
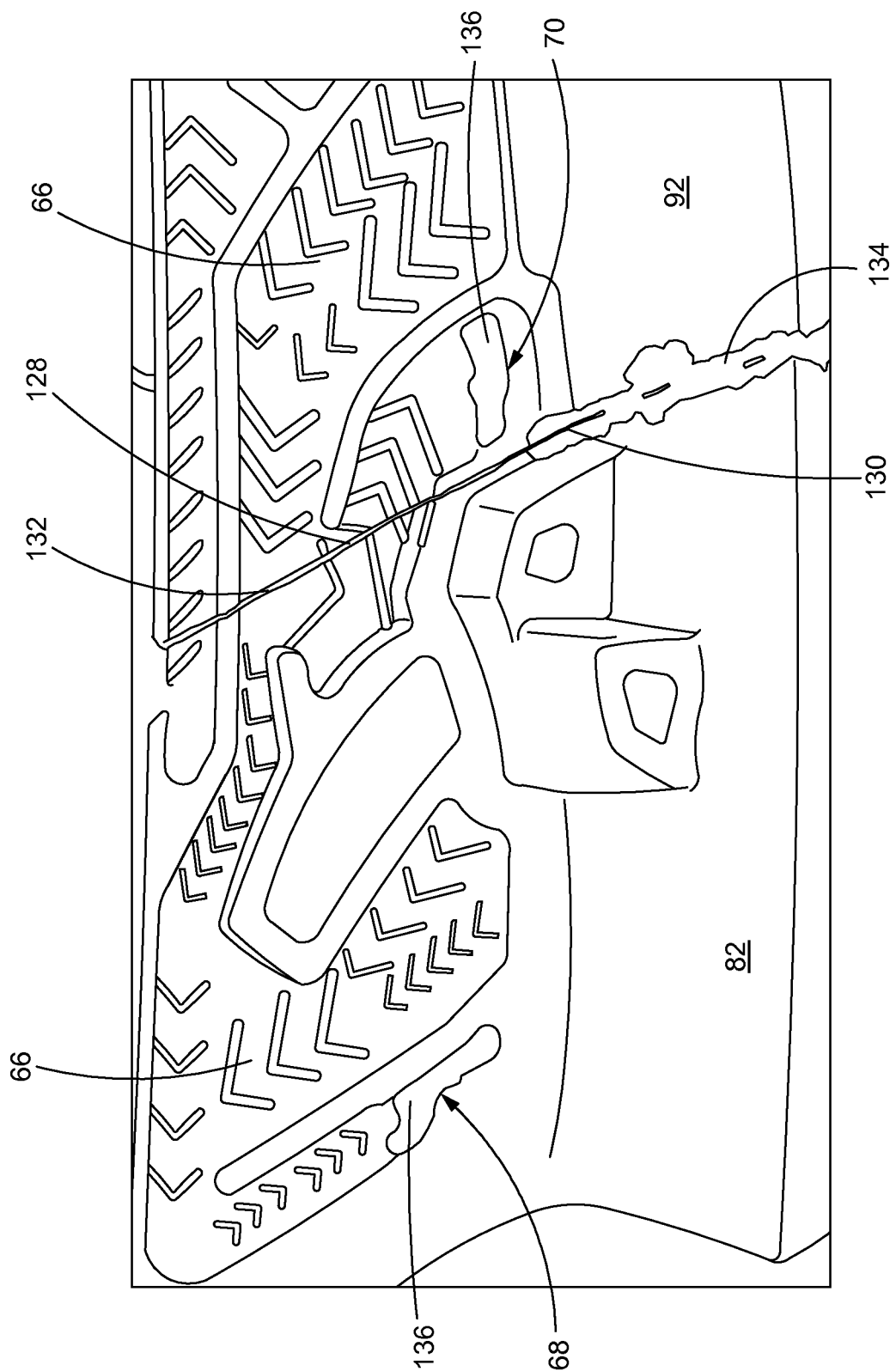
FIG. 15 is an enlarged view of the two airfoil cluster portions of FIG. 14 prepared for brazing.

Braze foil 132 is then placed within the braze gap 128, as shown best in FIG. 15. Braze slurry 134 may be also added to form a porosity-free bond joint. For example, blaze slurry 134 may be applied to a surface of the bond joint 130 around the passages 66 and contoured endwalls 64 to ensure unimpeded flow across the passages 66 and endwalls 64. Stop-off 136 may be applied to the passages 68, 70 to prevent the flow of braze foil 132 and braze slurry 134 within the passages 68, 70 during brazing. The assembled first and fourth portions 82, 92 are then heated in a furnace, where the braze foil 132 and braze slurry 134 melt, joining the two portions 82, 92 together to form a whole new airfoil cluster.

Figure 16:
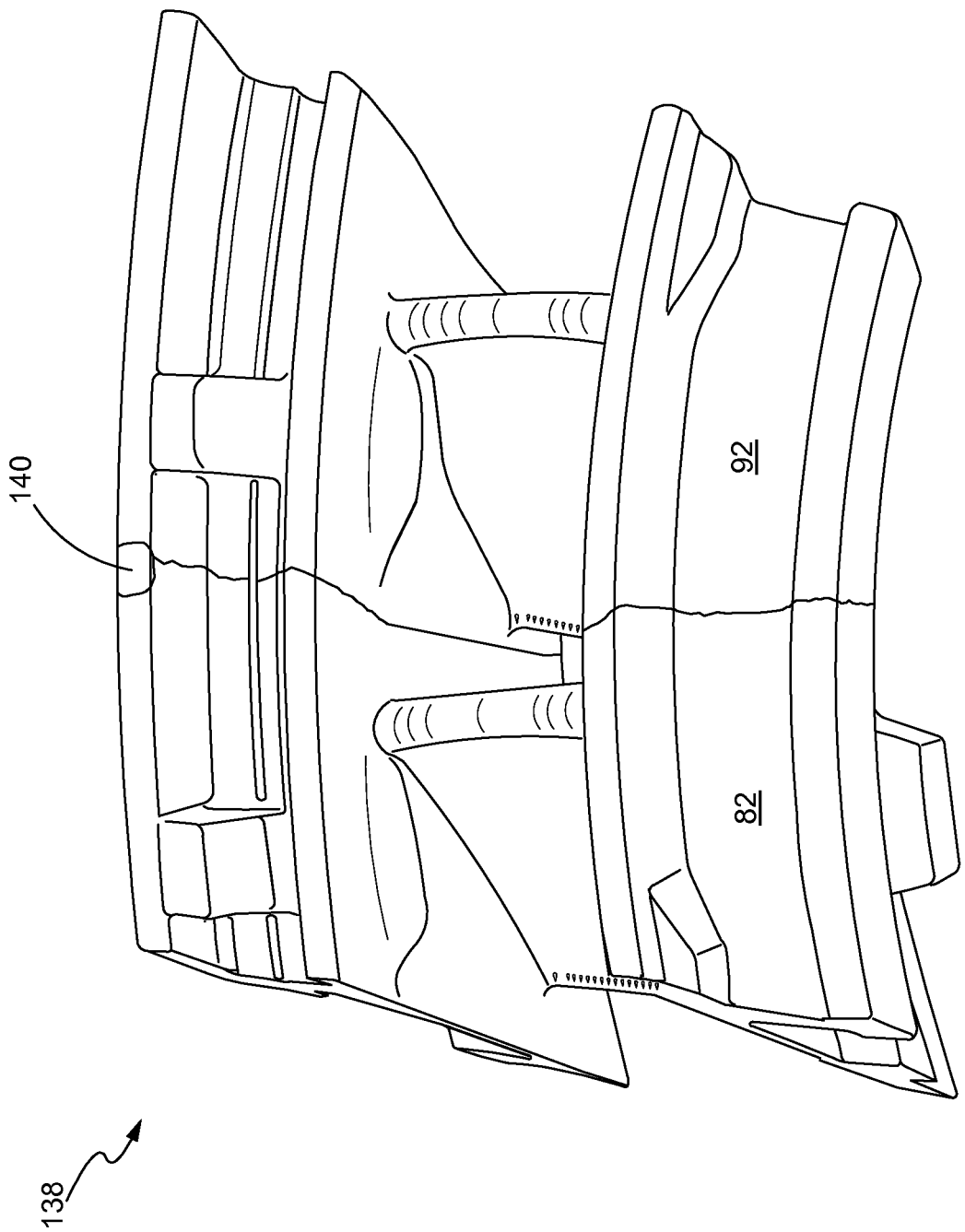
FIG. 16 is a perspective view of the two airfoil cluster portions of FIG. 15 joined together by brazing, thereby forming a new airfoil cluster.
Figure 17:
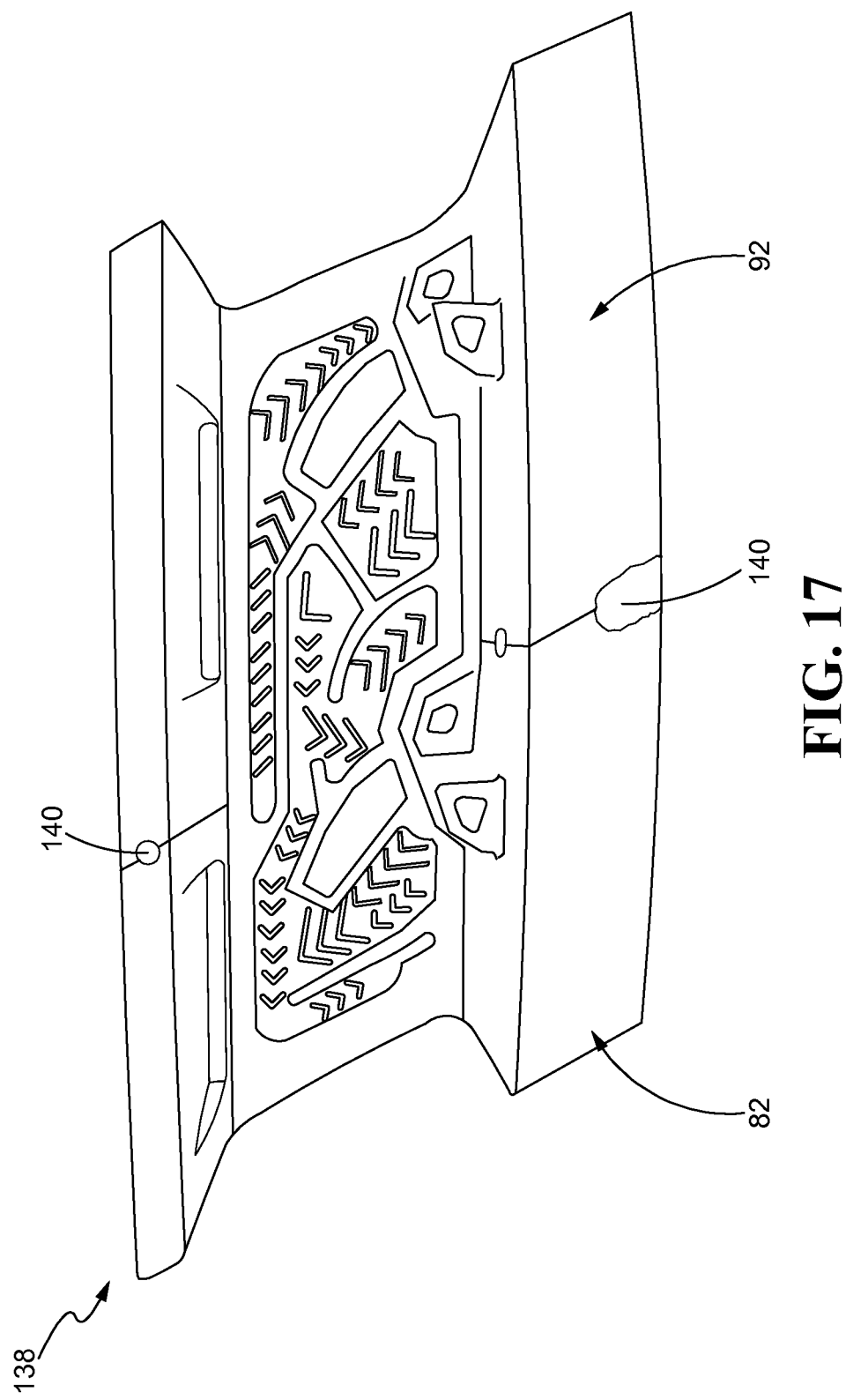
FIG. 17 is a top view of the new airfoil cluster of FIG. 16.

Lastly, at remove register blocks 42 in method 30 (FIG. 2), the register blocks 94 may be removed from the new airfoil cluster 138, as shown best in FIGS. 16 and 17. For example, the register blocks 94 may be removed via grinding. Other finishing processes may be performed on the new airfoil cluster 138 as well. For example, the stop-off 136 may be flushed out of the passages 68, 70, excess material such as tack welds 140 may be blended, airfoil cluster 138 may be grit-blasted, and inspection completed. The new airfoil cluster 138 may then proceed through subsequent manufacturing processes to introduce the airfoil cluster 138 into a new engine or to return it into a used engine. It is to be understood that although shown and described as applying to airfoil clusters, the method disclosed herein may be applied to other parts of the gas turbine engine as well, without departing from the spirit of the disclosure.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The present disclosure provides a method for working airfoil clusters of a gas turbine engine. The disclosed method can be applied to airfoil clusters composed of a single-crystal, rhenium-free alloy and airfoil clusters having endwall contouring and various serpentine passages, features for which repair methods have not previously accommodated. By attaching register blocks to the forward surfaces of the airfoil clusters such that outer surfaces of the register blocks align in a common plane spaced away from the airfoil clusters, precise alignment and attachment of the airfoil clusters is provided without compromising the integrity and structure of the airfoil clusters themselves. Furthermore, providing for the precise alignment of the airfoil clusters ensures the unimpeded airflow across the contoured endwalls and serpentine passages, thereby supporting the intended performance goals of the engine.

In addition, the disclosed method can be applied to salvage airfoils having one intact serpentine passage. A damaged portion may be removed with respect to the location of the intact serpentine passage when cutting, and other precautions may be made to ensure the functionality of the serpentine passage after brazing. As a result of the method disclosed herein, manufacturers are afforded great cost-saving benefits from using salvaged airfoil portions.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed, but rather includes all embodiments and equivalents encompassed within the claims appended hereto as well.

What is claimed is:

1. A method for working airfoil clusters of a gas turbine engine, the method comprising:
   providing a first airfoil cluster having a first portion and a second portion, the first portion including a passage through a platform of the first airfoil cluster;
   providing a second airfoil cluster having a third portion and a fourth portion, the fourth portion including a passage through a platform of the second airfoil cluster;
   attaching a first register block to the first portion of the first airfoil cluster;
   attaching a second register block to the fourth portion of the second airfoil cluster;
   cutting off the second portion of the first airfoil cluster such that the passage of the first portion is preserved, wherein the cutting of the second portion includes cutting through the platform of the first airfoil cluster;
   cutting off the third portion of the second airfoil cluster such that the passage of the fourth portion is preserved, wherein the cutting of the third portion includes cutting through the platform of the second airfoil cluster;
   aligning the first portion with the fourth portion through surfaces of the first and second register blocks;
   joining the first and fourth portions together to form a new airfoil cluster; and
   removing the first and second register blocks.

2. The method of claim 1, wherein the airfoil cluster is a stator vane cluster composed of a single-crystal material used in a turbine section of a gas turbine engine.

3. The method as in claim 1, further comprising:
   attaching the second register block to a supplemental portion; and
   joining the supplemental portion to the airfoil cluster, the first and second register blocks having a predefined arrangement with respect to one another which aligns the supplemental portion with the airfoil cluster.

4. The method of claim 3, wherein an outer surface of the first register block and an outer surface of the second register block has a predefined contour arrangement with respect to one another.

5. The method of claim 4, further comprising aligning the supplemental portion with the airfoil cluster by setting the outer surfaces of the first and second register blocks on a surface that matches the predefined contour arrangement.

6. The method of claim 3, further comprising aligning an endwall contouring and cross-platform cooling passages of the airfoil cluster and the supplemental portion through the use of the first and second register blocks.

7. The method of claim 3, further comprising removing a portion of the airfoil cluster such that a multi-directional passage of the airfoil cluster is preserved.

8. The method of claim 7, further comprising removing the portion of the airfoil cluster by cutting off the portion around the multi-directional passage.

9. The method of claim 3, further comprising removing the first and second register blocks, blending away excess material from the airfoil cluster and performing additional manufacturing operations on the airfoil cluster.

10. The method of claim 1, further comprising determining a location of a cut on the second airfoil cluster based on a location of a cut on the first airfoil cluster, and offsetting the locations of the cuts on the first and second airfoil clusters based on an amount of kerf.

11. The method of claim 1, further comprising providing an attachment hole and a separate locating hole in each of the first and second register blocks for attaching and locating the first and second airfoil clusters to a fixture during a cutting process, and using the attachment hole in the first register block for attachment of the first airfoil cluster to a fixture during a joining process.

12. The method of claim 11, further comprising machining the surfaces of the first and second register blocks in order to align the first and second airfoil clusters during the cutting process and the joining process.

13. The method of claim 12, further comprising aligning the surfaces of the first and second register blocks in a plane not within a space of the first and second airfoil clusters, and aligning an endwall contouring and cross-platform cooling passages of the first and second airfoil clusters through the use of the aligned surfaces of the first and second register blocks.

14. The method of claim 1, further comprising attaching two first register blocks to the first portion of the first airfoil cluster and two second register blocks to the fourth portion of the second airfoil cluster.

* * * * *